Aug. 25, 1970  J. W. DUNCAN ET AL  3,525,490
AIRCRAFT EJECTION SEAT SYSTEM

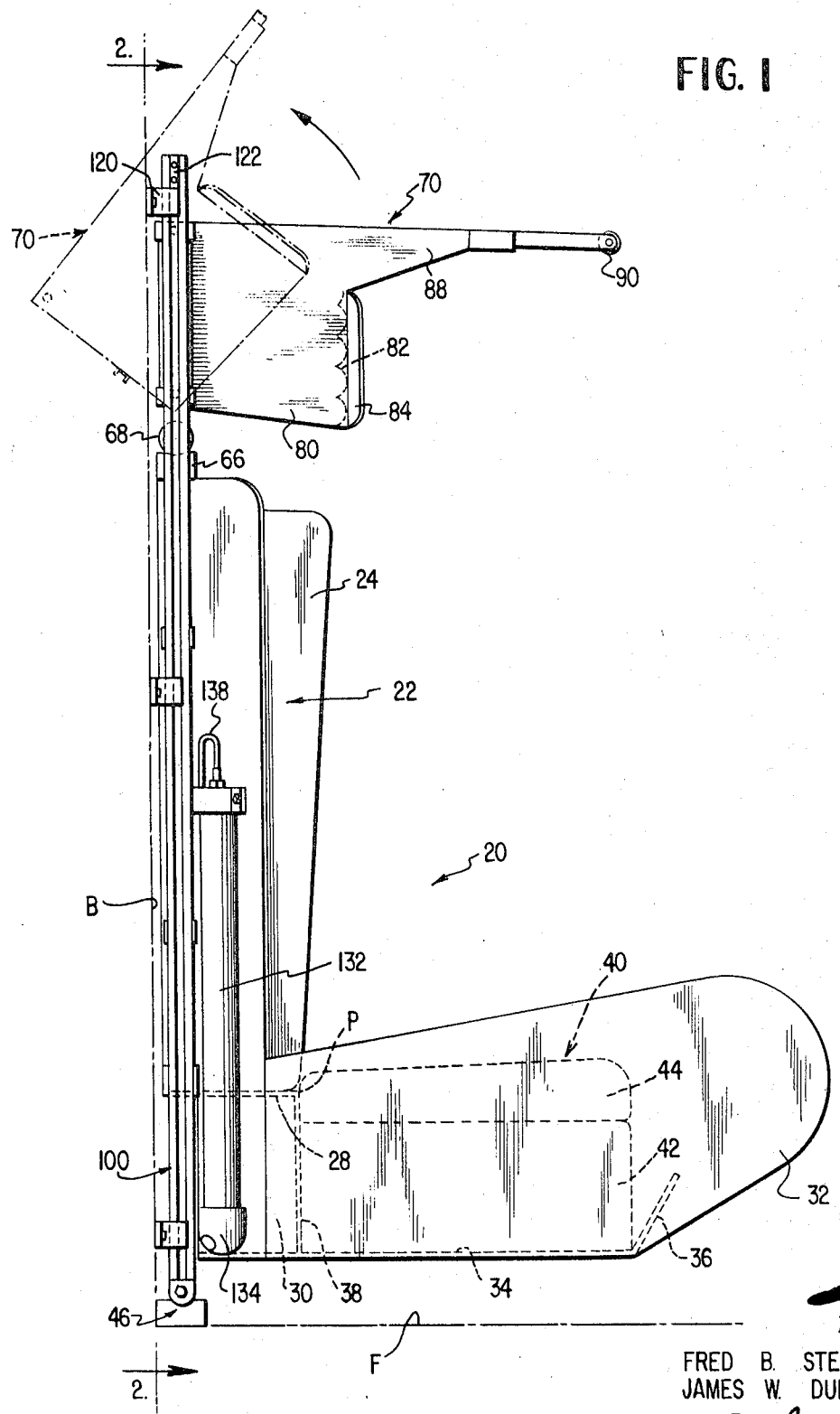

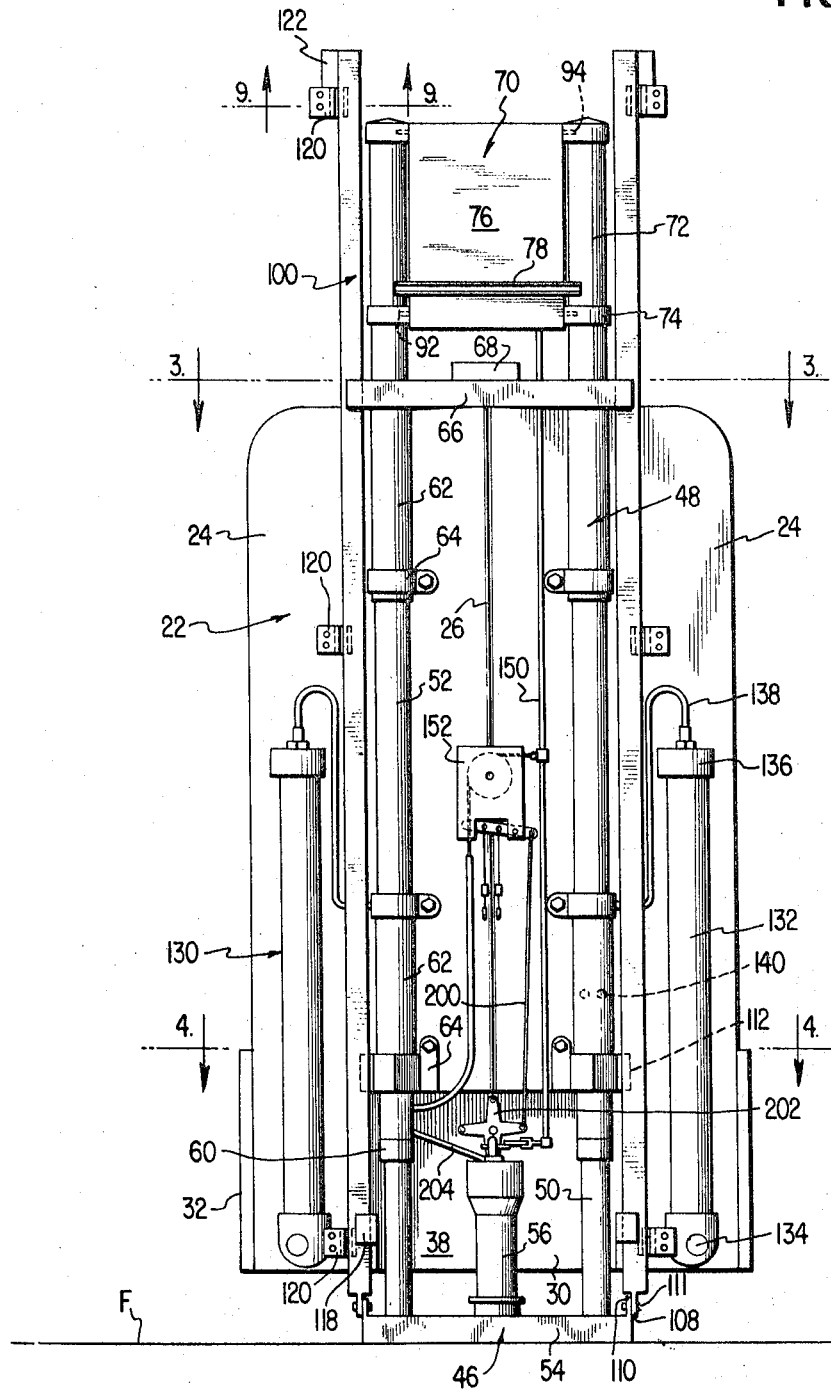

Filed April 11, 1968  4 Sheets-Sheet 3

INVENTORS.
FRED B. STENCEL
JAMES W. DUNCAN

BY Arnold, Roylance,
Kruger & Durkee
ATTORNEYS

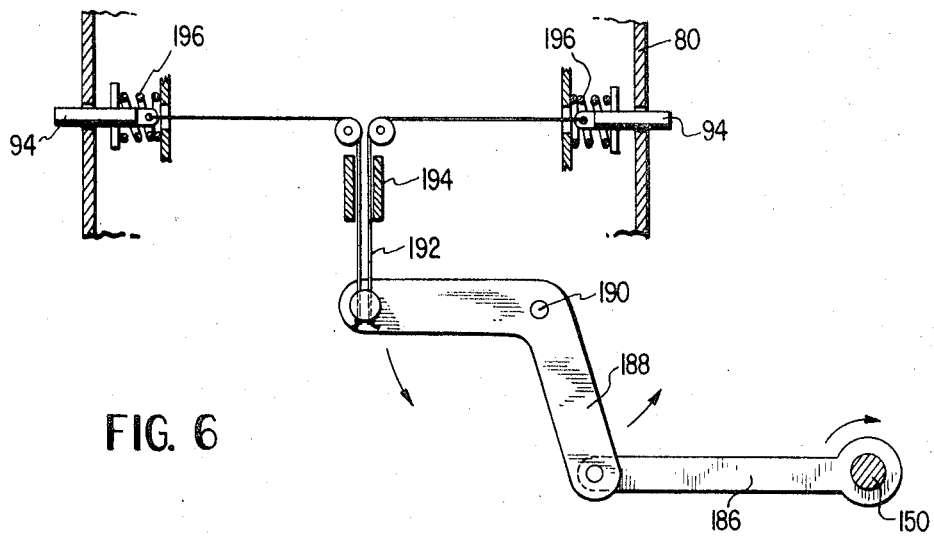
FIG. 6
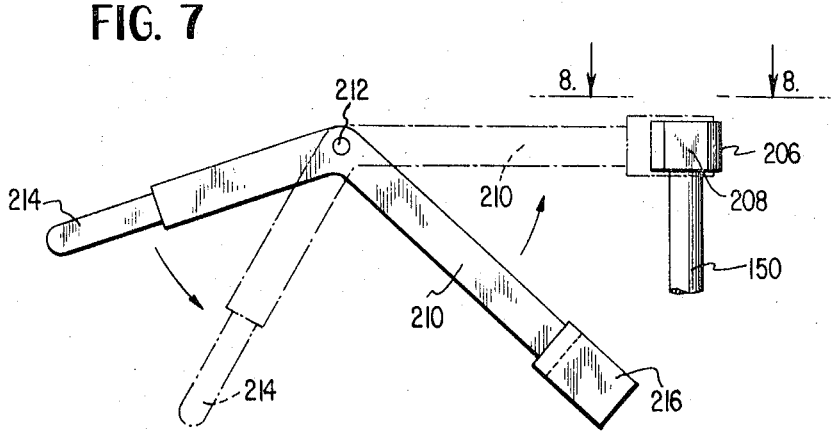
FIG. 7
FIG. 8
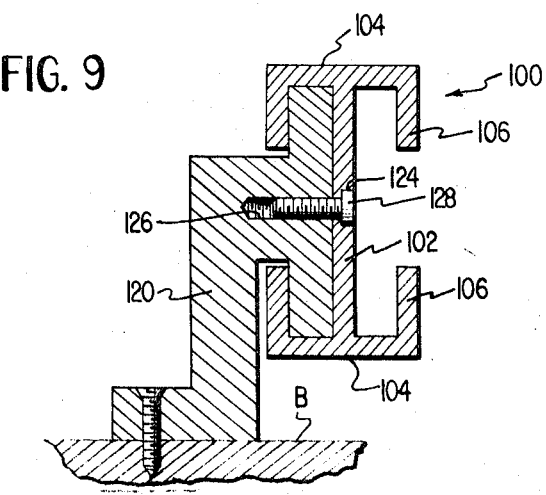
FIG. 9
INVENTORS.
FRED B. STENCEL
JAMES W. DUNCAN
BY Arnold, Roylance,
Kruger & Durkee
ATTORNEYS ically 3,525,490
AIRCRAFT EJECTION SEAT SYSTEM
James W. Duncan, Arden, and Fred B. Stencel, Asheville, N.C., assignors to Stencel Aero Engineering Corporation, Arden, N.C., a corporation of North Carolina
Filed Apr. 11, 1968, Ser. No. 720,650
Int. Cl. B64d 25/10
U.S. Cl. 244—122                                     16 Claims

ABSTRACT OF THE DISCLOSURE

An aircraft ejection seat system of minimum weight and size wherein various ancillary components and features can be incorporated or eliminated, as desired. The system includes a separate headrest means which is normally locked in an upright position but which is released during ejection to swing rearwardly thereby preventing interference with man-seat separation. The seat itself is of a unique, compact design which includes a seat back having a generally V-shaped cross-sectional configuration. A torque tube means attached to the seat back fires the ejection propulsion means and unlocks the headrest means at that time in the sequence of events when man-seat separation occurs. The system also includes ejection rail means which can be installed with the seat and attached to the aircraft solely by two screws. The construction of the catapults in the ejection propulsion means eliminates "tip-off" problems. The system is safe, easily and quickly operable, compact, efficient and relatively inexpensive for the functions which it performs.

---

This invention relates to aircraft ejection seat systems and more particularly it relates to a new and improved system incorporating various design and safety features not heretofore available.

In the normal, conventional and well-known type of aircraft ejection seat system, the seat itself is mounted within the cockpit of the aircraft and some ejection propulsion unit, such as a rocket and/or catapult system, can be utilized to propel the seat unwardly, usually along guide rails, to separate the seat from the aircraft in the event that the occupant of the seat encounters some difficulty which requires him to eject from the aircraft. Known and existing types of ejection seats have several well recognized disadvantages including the fact that such seats usually materially increase the weight of the aircraft and the size requirements for the cockpit or cabin. Moreover, all known types of ejection seats have been more or less "custom made" for the aircraft into which they are to be installed. Naturally, this means that for each different type of aircraft, where the size, weight and operational requirements differ somewhat, a different form of ejection seat had to be used. Thus, in turn, it was necessary to provide separate designs, repair parts, maintenance instructions, and so on for each different type of aircraft, depending upon the particular form of seat which was installed therein. Moreover, if it was decided to incorporate some additional or ancillary feature into a particular type of aircraft after an ejection seat had been "custom designed" for such aircraft, it was usually found that such ancillary or auxiliary feature could not be readily adapted for use in combination with the existing seat.

In contrast with the foregoing, it is a primary object of the present invention to provide a new and improved aircraft ejection system which is "universal" in that it can be used in a variety of different aircraft having different size, weight, design and operational requirements.

Another object of the present invention is to provide an aircraft ejection seat system wherein various ancillary or auxiliary features can be incorporated or eliminated, as desired, so that the seat itself can be "tailored" to the particular aircraft in which it is to be installed, yet regardless of how such a seat is adapted to a particular aircraft, it will still have many unique and desirable operational features not found in prior art seats.

Another object of the present invention is to provide an ejection seat assembly of a unique design and configuration so that size and weight can be minimized without compromising performance of the unit.

Further objects of the present invention include: (a) the provision of a separate headrest means which is swingable out of its normal position so that it will not interfere with man-seat separation; (b) a torque tube means rotatable to different rotational positions whereat it performs different operational functions during the ejection sequence; (c) a unique V-shaped cross-sectional configuration for the seat back to minimize the size requirements for the seat system; (d) a unique set of seat ejection rails which can be installed with the seat merely by lowering the seat and rails into the aircraft and which can be attached to the aircraft merely by inserting two screws; (e) a unique catapult arrangement which prevents tip-off and which accomplishes selective sequencing operations; and (f) a design which enables various "strap-on" auxiliary devices to be selectively incorporated in the system without compromising its weight, shape, serviceability, maintainability, reliability or function.

Other objects, advantages and salient features of the present invention will become apparent from the following detailed description, which, taken in conjunction with the annexed drawings, discloses a preferred embodiment thereof.

Referring to the drawings, which form a part of this specification:

FIG. 1 is a side elevational view of an aircraft ejection seat system in accordance with the principles of the present invention;

FIG. 2 is a rear elevational view thereof looking in the direction of the arrows 2—2 in FIG. 1;

FIG. 6 is a diagrammatic view of the torque tube means operating the headrest locking means;

FIG. 7 is a side elevational view of a safety handle means engageable with the torque tube means;

FIG. 8 is a fragmentary elevational view taken along the line 8—8 of FIG. 7; and FIG. 9 is a fragmentary sectional view taken along the line 9—9 of FIG. 2.

Figure 5:
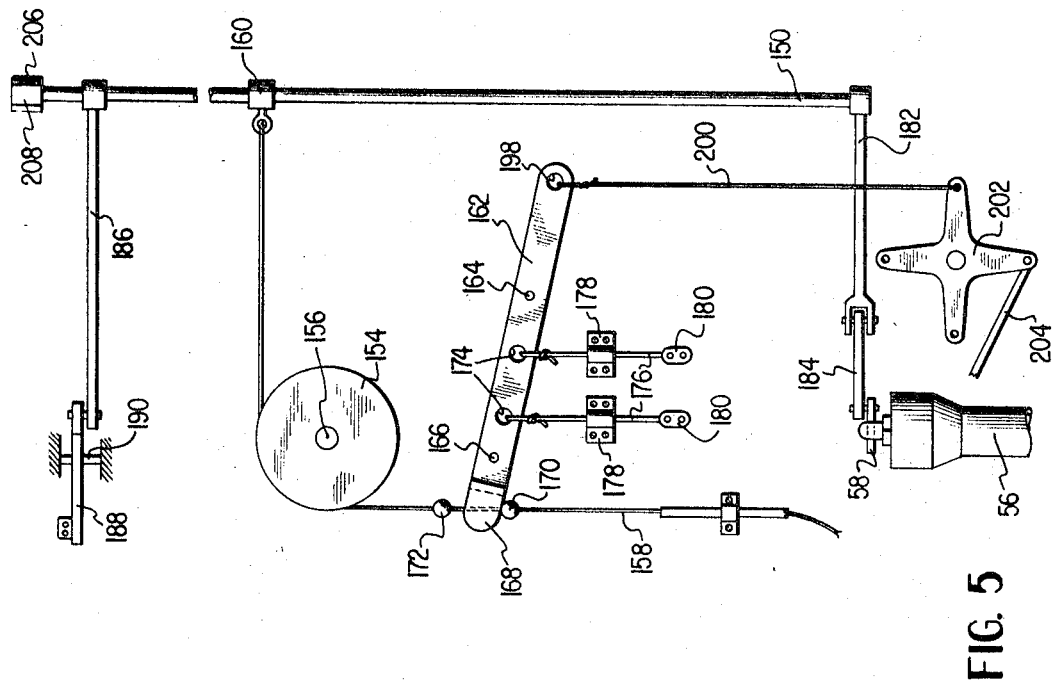
FIG. 5 is an enlarged diagrammatic view of the torque tube means and the operating means therefore and thereby.

Referring now to the drawings in greater detail, there is shown in FIGS. 1 and 2, an ejection seat assembly in accordance with the principles of the present invention, such assembly being generally designated 20. It will be understood that the seat assembly 20 is adapted for installation in the cockpit of an aircraft, and within such cockpit, the hypothetical floor line is designated F in FIGS. 1 and 2 and the hypothetical bulkhead is designated B in FIGS. 1, 3 and 4.

Figure 3:
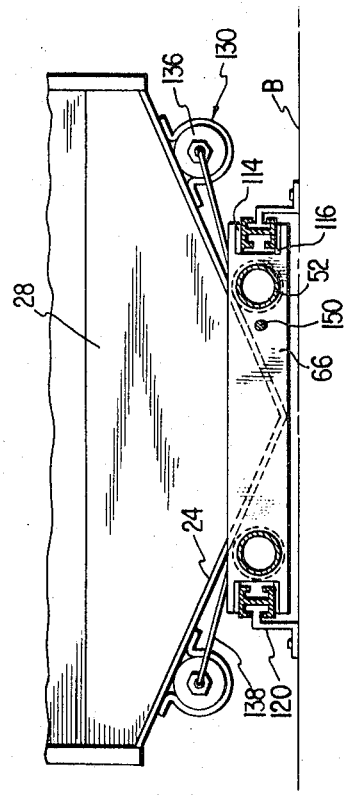
FIG. 3 is a fragmentary sectional view taken along the line 3—3 of FIG. 2.
Figure 4:
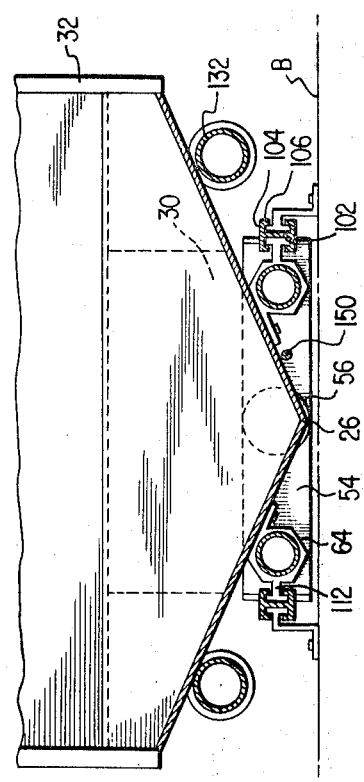
FIG. 4 is a fragmentary sectional view taken along the line 4—4 of FIG. 2.

The seat itself includes a seat back generally designated 22 formed by a pair of similar seat back portions 24 which are disposed angularly to one another and which intersect at a medial apex 26. As can best be noted from FIGS. 3 and 4, the two back portions 24 of the seat serve to define and subtend therebetween, a forwardly directed dihedral angle which opens toward the back of an occupant who would be seating within the seat assembly 20. Stated another way, the seat back 22 is of a generally V-shaped cross-sectional configuration having a high section-modulus to withstand severe bending moments, and this configuration enables the apex 26 along the back of the seat to define the rearwardmost portion of the entire assembly. Thus, as shown in FIGS. 3 and 4, this apex can be positioned in extrmely close proximity to the bulkhead B thereby enabling the assembly 20 to fit readily within even a compact cockpit or cabin. A short distance above the lower end of the seat back 22, a forwardly directed shelf means 28 is provided. This shelf means has a separate function which will be described in detail hereinafter, but in addition to this function, it will be seen that the shelf means serves to define therebeneath, a recess 30 which can house certain components which will be described hereinafter. The shelf 28 extends generally perpendicularly forward from the apex 26 of the seat back and preferably is formed integrally therewith. It is preferred that the entire seat back and shelf be fabricated of a suitable honeycomb construction to make the same as lightweight as possible without compromising the strength or rigidity thereof.

A pair of forwardly directed sheet type sides 32 extend forwardly from the outer edges of the seat back portions 24 along the bottom thereof and these sides 32 serve to define therebetween, the area which comprises the seat pan or bucket upon which the occupant seats himself when entering the assembly 20. The sides 32 are also fabricated of honeycomb construction to be lightweight, yet capable of withstanding aerodynamic loads induced laterally and outwardly on the occupant's legs. A bottom plate means 34 extends across the bottom of the seat assembly 20, between the sides 32 thereof, and at the forward end of this bottom plate 34, an upwardly directed front plate 36 is provided. A wall 38 extends downwardly from the forward edge of the shelf 28 to the bottom plate 34, as can best be seen in FIG. 1, and while this wall 38 could be considered to form the lowermost portion of the seat back 22, it additionally serves the function of providing the rear wall of a receptacle or chamber for the seat pan. In the embodiment of the invention illustrated herein, the seat pan which is generally designated 40 includes a standard survival kit 42 as is customarily supplied on most military type aircraft and which does not form any particular part of the invention herein. The survival kit 42 has lateral dimensions designed to fit between the sides 32 and has front to rear dimensions designed to fit between the front plate 36 and the wall 38 depending from the shelf 28. A seat pad or cushion 44 is positioned upon the survival kit 42, as shown in FIG. 1, to provide a comfortable seating surface for the occupant of the ejection seat. The neutral seat reference point where the effective plane of the seat back 22 intersects the effective plane of the seat pan 40 is formed at the location designated P in FIG. 1, such point also being the intersection of the forward end of the shelf 28 with depending wall 38.

An ejection means generally designated 46 is included for the purpose of ejecting the seat upwardly and out of the cockpit of the aircraft in which the seat is installed. The ejection means 46 includes a pair of catpult assemblies generally designated 48, such assemblies being disposed along the back of the seat on opposite sides of the apex 26. Each catapult assembly includes a pair of telescoped tubes, namely, an inner tube 50 and an outer tube 52. The details of these catapult assemblies 48 are described in more detail in our copending application Ser. No. 708,702, filed Feb. 27, 1968, but in order to give a general understanding of the operation of these catapults, it will be seen that the inner tubes 50 have their lower ends connected to a transversely extending header or manifold 54 supported along and customarily affixed to the floor line F or other supportive means affixed to the airframe. An explosive cartridge means 56 is provided centrally upon the header 54, such cartridge means being disposed within the recess 30 in alignment with the apex 26 along the seat back. As can best be seen in FIG. 5, the cartridge 56 includes a retractable sear 58, which, when pulled, ignites the cartridge to cause high pressure gases to be transmitted through the header 54 and into each of the catapult assemblies to untelescope the same. The lower ends of the outer tubes 52 in the catapult assemblies rest upon adjustment nuts 60 which are threaded upon the exterior of the inner tubes 50. Thus, when each adjustment nut 60 is tightened, the play between a pair of respective inner and outer tubes 50 and 52 is eliminated. Each outer tube 52 extends through a pair of hollow cylindrical sleeve member 62 attached to the seat back 22 by means of caps 64. The upper ends of the uppermost sleeve members 62 connect with a bridge member 68 extending across the top edge of the seat back. However, the tubes 52 of the catapult assemblies project through holes in the bridge member 66 and extend for a considerable distance above the top edge of the seat back, as is clearly seen in FIG. 2.

As explained in detail in our aforementioned copending application, a releasable locking means is provided to interconnect the inner and outer tube of each catapult assembly 48, and as the cartridge 56 is fired, the pressures generated thereby release the locking means to enable the catapult assemblies to untelescope. Since the outer tubes 52 are attached to the seat back while the inner tubes 50 are attached to the header 54, which, in turn, is attached within the cockpit of the aircraft, the tubes can untelescope from one another once the locking means has been released to enable the seat to eject upwardly out of the aircraft, with the outer catapult tubes attached thereto while the inner tubes and the header remain within the aircraft. Also, our aforementioned copending application discloses an arrangement wherein a vertical height adjustment means is provided for the seat back by a cooperative assembly between the catapult assemblies 48 and the sleeve member 62 through which the outer catapult tubes project, and an arrangement wherein a canopy breaker means is mounted in the top of the catapult to be fired upwardly to shatter the canopy when the catapults are actuated. Although neither this adjustment feature nor this canopy breaker feature is described herein, it will be understood that the catapult assemblies 48 utilized herein can incorporate each of these features, if desired, and accordingly, the teachings of the aforementioned copending application can be considered as incorporated herein by reference. Any suitable form of haulback device 68 can be mounted upon the bridge member 66 to permit the occupant freedom of movement except during ejection operation. A headrest means generally designated 70 is mounted above the seat back means 22 by a pair of separate sleeve members 72 which are telescoped over the upper ends of the catapult assemblies 48, each such sleeve member including an enlarged upper and lower ring 74. The hardest means includes a back member 76 which carries a transversely extending beam 78, the outer edges of which engage against the back of the tubes 72 to prevent the headrest means from inadvertently swinging forward beyond a position where the back panel 76 is substantially parallel to the plane of the seat back. The headrest means 70 also includes a pair of spaced apart side members 80 which project forwardly from the back panel 76. A pad or cushion 82, which may, if desired, be formed of energy-absorptive material, extends between the side members so that the occupant of the seat can rest the back of his head thereagainst. At the lower portion of the side members 82, outwardly directed or angled vanes 84 are provided. At their upper part, the side members include a forwardly projecting portion 88 which projects forwardly beyond the cushion 82 and which hence normally overlies the top of the occupant's head to protect the occupant's head in case the seat ejects through the canopy. A face curtain type firing means can be provided in the headrest 70, and, as such, the handle for such face curtain, designated 90, projects forwardly from the ends of the headrest portions 88.

Since both the function and operation of face curtain type ejection initiators is well-known in the ejection seat art, it is not considered necessary to describe in detail of the same herein. A typical prior art type of face curtain arrangement is shown in U.S. Pat. No. 2,467,763 issued to J. Martin on Apr. 19, 1949. In the face curtain system of the present invention, just as in the face curtain system shown in the aforementioned Martin patent, and in prior art arrangements as well, the occupant of the seat reaches over his head grabs the handle 90 of the face curtain and pulls the same downwardly over his face. This pulling on the face curtain serves to initiate the ejection means, and additionally, the face curtain serves to insure that the seat occupant is in generally the correct posture for ejection. Moreover, once ejection has occurred, the face curtain protects the occupant's face from the initial wind blast.

The mounting means for the headrest means 70 is formed by a pair of axially aligned outwardly projecting pins 92 which fit into the lower rings 70 at the bottom of the sleeves 72, as shown in FIGS. 1 and 2. As such, the pins 92 serve to define a pivot axis about which the headrest means is mounted and the headrest means is thus swingable rearwardly about this pivot axis, as shown in phantom lines in FIG. 1. The beam 78, as aforementioned, prevents the headrest means from swinging forwardly beyond its solid line position of FIG. 1. The details of this releasable locking means for the headrest are shown in FIG. 6 and will be described in detail hereinafter, but for the present, it is sufficient to state that such releasable locking means includes a pair of retractable locking pins 94 which are axially aligned with one another and which fit into the rings 74 at the upper end of the sleeves 72. Hence, when the locking pins 94 are engaged in these rings, both the top and the bottom of the headrest means are restrained and the headrest means thus remains in the solid line position of FIG. 1. However, when the locking pins 94 are retracted out of their cooperating rings 74, then the headrest means is mounted solely by the lower pair of axially aligned pins 92, and as a result, the headrest is swingable rearwardly about a pivot axis extending through these pins. Such rearward swinging is, as aforementioned, shown in phantom lines in FIG. 1 and can be accomplished in different ways. The primary way to accomplish such rearward swinging is to allow the mass inertia of the headrest to swing it rearwardly when the seat is snubbed by snubbing lines attached to the aircraft. As another example, a separate ballistic charge can be provided for swinging the headrest to its rearward position after the locking pins have been retracted. Alternatively, it will be remembered that the parachute pack which is harnessed to the back of the seat occupant is disposed within the dihedral angle of the seat back 22, beneath the headrest means 70. If, as preferred, the parachute pack is of a ballistically deployed type, such as that shown in U.S. Pat. No. 3,133,718, issued May 19, 1964 to F. B. Stencel, then the ballistic deployment of the chute will serve to contact the underside of the headrest means and swing the same rearwardly. In any event, it will be understood that the headrest means does not remain rigidly fixed in its solid line position, as shown in FIG. 1, where it could interfere with the separation of the occupant from the seat by contacting the parachute pack carried by the occupant, hence throwing the occupant into a dangerous spin.

A pair of ejection rail means generally designated 100 are provided, on opposite sides of the apex 26 of the seat back, for the purpose of guiding the seat during its egress upwardly out of the aircraft. Each ejection rail means is a continuous elongated upstanding member whose configuration, as can be seen from FIGS. 3, 4 and 9 includes a central web portion 102, a pair of perpendicularly projecting flanges 104 being disposed laterally along opposite edges of the central section 102, each flange portion carrying a reversely directed shoulder or angle 106. As a result, one side surface of the central portion 102, the two flange portions 104 projecting laterally from that side surface, and the reverse shoulders 106 carried by such flanges serve to set off and define a continuous upstanding hollow channel. Also, the confronting shoulders 106 are spaced from another to define a continuous groove or slot which communicates with the channel. In other words, each ejection rail means includes a pair of similar channel and slot arrangements, which, as can be seen from FIGS. 3 and 4, are generally T-shaped in cross-sectional configuration. Since these rail means 100 are provided along each side of the seat back, each carries a channel directed toward the apex 26 of the seat back, and these channels can be nominally designated inner channels. Similarly, each rail means carries a channel opposite to the inner channel thereof and these channels can be nominally designated outer channels. As shown, each rail means 100 terminates in a lower web 108 which is positioned adjacent a similar upstanding web 110 at the outer edge of the header 54. Bolt means 111 extends through suitable holes in the webs 108 and 110 to thereby mount the bottom ends of the ejection rail means 100 to the header 54. As shown in FIGS. 2 and 3, each of the lowermost caps 64 connected to the seat back 22 carries an outwardly directed bearing block or slipper block or pillow block means 112 of a generally T-shaped configuration to slidably fit within the inner channel of the adjacent ejection rail means. Also, the outer ends of the bridge member 66 are provided with recesses 114 through which the ejection rail means project. A resinous pad 116, formed of nylon or some other suitable material, having a low coefficient of friction, is mounted along the rear edge of the recess 116 to the slide against the back surface of the ejection rails as formed by the rearward motion of projecting flange means 104. Finally, as shown in FIG. 2, the seat carries adjacent the lower edges thereof, a pair of runners 118 which engage against and ride along the back of the ejection rails during an ejection operation.

As will be appreciated, since the ejection rail means 100 are connected by slidable connections with several portions of the seat back, the ejection rail means can be mounted upon the seat assembly at the time that the same is being fabricated and assembled. Then, the entire seat assembly, with the ejection rails thereon, can be suitably lowered into the open cockpit of the aircraft in which the seat is to be installed. The cockpit of the aircraft is provided with several fixed or outer mounting blocks 120 which bolt onto the bulkhead B and which include a generally T-shaped end configuration which can be slidably received within the outer channels of the ejection rail means. Thus, as the seat assembly with the rails attached thereto is lowered into the aircraft, the installers need only make sure that the outer blocks 120 are slidably received within the outer channels of the ejection rail means during lowering of the seat. At the upper end of each of the ejection rails, along the outer surface thereof, a bearing block 122 is provided, customarily by bolting the same onto the ejection rail. Through the utilization of this bearing block means which engages against and abuts upon the top of the uppermost slipper block 120, it is possible to suspend the entire seat assembly in the aircraft so that the full weight of the seat and its occupant need not act directly upon the floor F in the aircraft. In any event, once the seat and its attached rails have been fully lowered into the aircraft, as just described, means must be provided for attaching the ejection rails to the pillow blocks 120 fixed within the aircraft to assure that the ejection rails will remain fixed within the aircraft, even during ejection. To accomplish this, an aperture 124 is provided through the central web 102 of each ejection rail means, such aperture aligning with a threaded bore 126 in the uppermost pillow block 120 when the assembly has been fully lowered, as illustrated in FIG. 9. Then, by installing a bolt 128 through the aperture 124 to thread into the bore 126, the ejection rails can be attached to the outer blocks 120 and hence to the bulkhead B in the aircraft. In other words, the entire assembly including the ejection rails can be freely lowered into the aircraft and the installers need only insert two bolts 128, one through each upper ejection rail part, to fully connect the ejection rails to the aircraft. Naturally, in a similar manner, if it becomes necessary to remove the ejection seat assembly for repair or modification, a mechanic need only remove the pair of bolts 128 whereupon the entire assembly, including the ejection rails 100, can be lifted upwardly out of the aircraft.

The head of each bolt 128 is suitably recessed or otherwise countersunk so that it will not interfere with the pillow block 112 slidable through the inner channel, although, if desired, the pillow block could be provided with a recess which could pass over the head of the bolt 128.

It will thus be understood that as the seat starts to eject from the aircraft, through energization of the catapult assembly 48, the seat pan and back, with the outer catapult tubes attached thereto, start to move upwardly. As this occurs, the inner pillow blocks or bearing blocks 112 run upwardly through the inner channels in the ejection rail means, the nylon pads 116 on the bridge member 66 run along the back of the rail means, and the runners 118 run along the back of the rail means. The length of the inner and outer catapult tubes 50 and 52, respectively, is adjusted properly so that such tubes separate before the slipper blocks 112 clear or exit from the top of the ejection rail means 100. Additionally, even at this point, the runners 118 are still running along the back of the ejection rail means. This more or less simultaneous catapult tube separation and inner channel slipper clearance serve to eliminate the rotational-type "tip-off" problematic motions which ordinarily occur during ejection of an ejection seat. More specifically, in the ordinary ejection seat, when the lowest or last pillow block or roller is still engaged with the guiding rails, but the other ones are free, an aerodynamic or inertial force tends to alter control of the seat trajectory to make the same follow a random on unpredictable path depending upon the airstream velocity encountered. The present invention eliminates the "tip-off" contribution induced inertially, by correlation of the length of the inner and outer catapult tubes to get a guided stroke all the way to separation of the slipper 112 from the ejection rail means. Thus, these "tip off" problems do not occur and the trajectory of the seat is along its preselected and predeterminable path.

It will be noted that a pair of thrust producing rocket means generally designated 130 are provided along the seat back 22. Each rocket means 130 is spaced outwardly from the catapult tubes and ejection rail juxtaposed to its seat back portion 24, as can clearly be seen from FIGS. 2, 3 and 4. The rockets include a body 132 having a nozzle 134 mounted at the lower end thereof. Preferably, each nozzle 134 is canted slightly outwardly so that the combined thrust forces from the two rocket means 130 will be directed on a converging path toward one another intersecting essentially at the center-of-gravity of the ejected mass. A suitable pressure type igniter means 136, of any conventional design, is provided at the top of the rocket body 132, and a flow conduit 138 connects from the igniter means 136 to the adjacent catapult assembly 48, preferably the lowermost sleeve 62 thereof. Orifice means 140 are provided through the inner catapult tubes 50 as the same extend through the lowermost sleeve members 62 on the seat back, and as a result, once the catapult assemblies 48 are operated to cause the tubes to untelescope, the outer tube 52 will eventually move upwardly, thereby uncovering the ports or orifices 140 formed in the inner tube. This, in turn, permits the catapult gases to escape through these orifices and through the sleeve 62 to travel through the conduit 138 and to hence ignite the igniter 136 and the rocket means 130 associated therewith. By providing this sequencing type of ignition means for the rockets 130, it will be understood that the same are not fired until after separation of the telescoping catapult tubes. It must be understood that from a physiological standpoint, it is undesirable for (a) the catapult thrust to die off and the rocket thrust to thereafter pick up sharply, thus causing two G-spikes, or (b) the catapult thrust and rocket thrust to superimpose on one another, thus causing excessive G-spike overshoot. Either of these undesirable situations can exceed the physiological tolerances of the seat occupant and cause him to sustain serious injury. Hence, in the present invention, the catapult thrust and rocket thrust merge cooperatively with a smooth transition to optimize the ejection thrust forces without causing any physiological damage to the seat occupant. Specifically, as aforementioned, ejection is commenced by withdrawing the sear 58 of the explosive cartridge 56, thereby permitting the cartridge to fire and transmit its high pressure gases through the header 54 and into the catapult assemblies 28 to start untelescoping the tubes of these assemblies. This untelescoping, in turn, starts to lift the ejection seat, with the occupant therein, upwardly out of the aircraft within which the seat is installed. Thus, the initial lifting or ejection forces are provided solely by the catapult assemblies 48. Then, when the tubes of the catapult assemblies have untelescoped for a sufficient degree of travel to permit sequencing of the gases therein through the conduits 138, the rocket means 130 are ignited to provide substantial additional lifting thrust forces which aid in the ejection of the seat.

Referring now to FIGS. 2 and 5, the operating mechanism of the present invention can be described in some further detail. By referring to these figures, it will be noted that an elongated torque tube 150 is rotatably mounted along the seat back 22, offset slightly from the apex 26 thereof. A bracket means 152 is mounted along the seat back, aligned with the apex 26 thereof, about midway between the top and bottom of the seat back, and in FIG. 5, this bracket means has been removed to enable the parts therewithin to be described. By referring to FIG. 5, it will be seen that a pulley 154 is rotatably mounted on a pivot shaft 156 extending from the seat back. The ejection cable 158 extending from the face curtain described hereinbefore is trained over the pulley 154 and connects to a collar 160 fixed on the torque tube 150. An elongated lever 162 is also attached to the seat back by means of a pivot pin 164 mounted eccentrically along the lever 162. Also, a shearable pin 166 is provided on the lever to normally prevent the same from rotating about its axis 164. The end of the pivot lever 162 adjacent the shearable pin 166 is forked or bifurcated, as shown at 168, and the ejection cable 158 passes through the opening in the forked end 168 on the lever. A pair of stop balls 170 and 172 are carried in spaced relation along the ejection cable 158 with the size of these balls being large enough to prevent the same from passing through the opening at the forked end 168 of the lever. A pair of apertures 174 are provided in the pivot lever 162 between the pivot pin 164 and the shearable pin 166 thereof. Snubbing lines 176 are attached through each of these holes 174 and depend downwardly through guides 178 to terminate in a lower connection end 180 which ordinarily attaches to static lines carried by the aircraft.

The lower end of the torque tube 150 carries a laterally projecting crank arm 182 which, in turn, is pivotally connected to a link 184 which pivotally attaches at its other end to the sear 58 on the explosive cartridge 56. Although it has previously been stated herein that the ejection cable 158 is connected to the face curtain in the headrest means so that when headrest handle 90 is pulled, the ejection cable 158 will be pulled, it will also be understood that any other suitable form of ejection cable actuating means can be utilized. Such actuating means can include, for example, a hand operated actuating lever mounted in one of the side members 32 of the seat or a lever extending through the seat pan to project upwardly between the occupant's legs as he sits within the seat. Nevertheless, regardless of how the cable is actuated by the occupant when he desires to initiate ejection, such actuation will cause the cable 158 to be pulled downwardly until the ball 172 contacts the top of the forked end 168 on the pivot lever 162. This downward movement of the ejection chamber 158 is transmitted to the collar 160 carried by the torque tube 150 and hence causes a rotational movement of the torque tube to a first rotational position. When the torque tube 150 reaches this first rotational position, its crank arm 182 at the lower end thereof will have been rotated sufficiently to withdraw the sear 58 from the cartridge 56, thereby enabling the firing pin in the cartridge to explode the pyrotechnic charge therein to transmit high pressure gases to the catapult assemblies 48. This, as aforesaid, starts the seat ejecting upwardly.

As the seat ejects upwardly, a pair of static lines, not shown, which have one end connected in the aircraft and which have the other end connected to the connections 180 on the snubbing lines 179, pull taut. Thereafter, further upward ejection of the seat will cause the pin 166 to be sheared and, as a result, the pulling forces on the snubbing lines 176 will cause the lever 162 to pivot, in a counterclockwise direction in FIG. 5, until the bottom of the forked end 168 thereof contacts against the lower stop ball 170 and continues to push downwardly on the same, thereby creating a further pull on the ejection cable 158. This further pull, in turn, rotates the torque tube from its first rotational position to a second rotational position. It will be noted that the torque tube also carries a further crank arm 186 adjacent its upper end and, as shown in FIG. 6, this crank arm 186 connects with a bell crank lever 188 pivotally mounted at 190 within the headrest means 70. While the crank arm 186 is connected with one end of the bell crank 188, the opposite end of the bell crank connects with suitable cable means 192 which extend through a guide 194 in the headrest to attach to the inner ends of the locking pins 94. As shown in FIG. 6, biasing means 196 normally urge the locking pins 94 outwardly to a projected position which, as aforementioned, enables the pins to lock within the uppermost rings 74 to maintain the headrest in its solid line position of FIG. 1. However, when the torque tube 150 is rotated to its second rotational position, the crank arm 186 rotates the bell crank 188 which, in turn, pulls on the cables 192 to overcome the biasing force of springs 196 and to hence retract the locking pins 94. As a result, the head rest means 70 is thereafter in a condition to be swung rearwardy to its phantom line position of FIG. 1.

It will further be noted that the pivot lever 62 has a hole 198 at the end opposite the forked end 168. A cable 200 connects from this hole 198 and extends downwardly to attach to one of the arms of a pivotally mounted bell crank 202. While such bell crank has been shown in FIG. 5 as being offset to one side of the cartridge 56, such showing is mainly for illustrative purposes although, if desired, such an arrangement could be utilized. However, a more accurate showing is illustrated in FIG. 2 whereIn the bell crank 202 is disposed in the recess 30 under the shell 28 and behind the explosive cartridge 56 in substantial axial alignment with the apex 26 along the seat back. Another arm of the bell crank 202 carries a release link or cable 204 which connects with the lap-belt and shoulder restraint release mechanism, not shown, which normally locks the occupant within the seat. In other words, as the snubbing lines 176 rotate the pivot lever 162 to release the headrest locking pins 94, such pivot lever also rotates the bell crank 202 to substantially simultaneously release the lap-belt and shoulder restraint means which provides the man-seat connection means. Additionally, if desired, a further release pin means, similar to the head rest locking means, can be utilized for releasing the connection of the face curtain to the headrest means when the torque tube reaches this second rotational position. It will thus be understood that at such second rotational position, the headrest is unlocked for rearward swinging and the connection means between the man and the seat is released so that the occupant of the seat can separate therefrom.

The torque tube 150 is also provided with a collar 206 having a pair of flat sides 208. A safety lever 210 in the form of a bell crank is provided, such lever being pivotally mounted at the knee thereof by a pivot pin 212. One end of the bell crank is provided with a hand engageable handle 214 while the other end thereof is provided with a forked or bifurcated end 216 engageable with the flats 208 on the collar 206 carried by the torque tube 150. Ordinarily, the safety lever is in the solid line position shown in FIG. 7 whereat it is out of engagement with the torque tube 150 so that the torque tube is free to move to its rotational positions in response to a pulling effect by the ejection cable 158. However, when the safety lever 210 is pivoted to its phantom line position of FIG. 7 so that the forked end thereof engages with the flats 208 on the torque tube, the torque tube will be prevented from rotating. The safety lever is utilized when the seat is being installed or worked upon by mechanics, and so, on to prevent any inadvertent ejection thereof. That is, so long as the safety lever 210 is in the phantom line position of FIG. 7, the torque tube 150 cannot rotate and hence the sear 58 will not be withdrawn from the explosive cartridge 56. While the safety lever 210 would be mounted in the headrest means 70 in the illustrated embodiment hereof, the same could also be provided along the seat pan between the occupant's legs, if desired, in which event the collar 206 would be placed at a different position along the torque tube 150.

The foregoing detailed description sets forth the basic inventive aspects of the present invention and describes the operation of the same. However, for purposes of completeness, the main functions performed by the various components and portions of the present invention will now be reviewed. The swingable headrest means 70 normally maintains an upright and erect position against which the occupant can rest the back of his head, but when the locking means on the headrest is released, the same can swing rearwardly. This rearward swinging can be unpowered to be effected strictly by inertia at snubbing, or by contact of the upper end of the parachute pack carried by the occupant against the underside of the headrest. It could also be accomplished by powered means, and as, for example, a ballistically deployed parachute which would swing the headrest rearwardly. Still further, if necessary and desirable, a separate ballistic means could be provided to be actuated upon release of the locking means to ballistically swing the headrest to its rearward position.

The torque tube 150 of the present invention is rotated to various rotational positions by pulling forces on the ejection cable 158. The ejection cable 158 can itself be actuated by pulling on the face curtain handle 90 or any other suitable actuating handle, mounted at any convenient spot on the seat. As the torque tube rotates to its first rotational position, it operates to withdraw the sear 58 for firing the cartridge 56 and hence operating the catapult assemblies 48. As the torque tube rotates to its second rotational position, it releases the headrest locking pins 94 so that the headrest can swing rearwardly. Additionally, although not illustrated, it has been stated that at this second rotational position, the torque tube can also release locking pins which hold the ejection handle or handles to the seat so that the handles thereafter come free.

The catapult assemblies 48 have not been described in too much detail herein since the same are fully described in detail in our aforementioned copending application, but, if desired, the height adjusting means and the canopy breaker means set forth in such copending application can be incorporated on the catapult assemblies hereof.

The snubbing lines 176 function to rotate the torque tube 150 to its second rotational position and thereby function to release the man-seat attachment. The seat itself is compact in configuration and is preferably fabricated of a light-weight honeycomb construction. The maximum height of the seat is fixed and the headrest means 70 is fixed in position and even if the seat is to be adjusted by the adjustment means described in our aforementioned copending application, it is the seat pan and back which are moved vertically while the headrest means remains fixed in position. The generally V-shaped cross-sectional configuration of the seat minimizes the distance between the back of the seat and the bulkhead to assure bending strength and rigidity and provides for a compact seating arrangement which can fit in a cockpit having even a minimum size.

The ejection rails 70 can be installed and removed with the seat and merely by attaching or releasing two screws 128, the entire rail assembly can be connected to or disconnected from the bulkhead of the aircraft. It will thus be appreciated that the entire seat with the rails attached thereto can be readily lowered into position in the cockpit of the aircraft, the two screws 128 can be installed, and once the oxygen and electrical umbical connections have been made, the entire installation operation is completed. As a result, there is no complex and time consuming installation and/or removal procedure of the type heretofore encountered in the periodic servicing of ejection seats.

Through the use of the mounting blocks 122 at the top of the ejection rail means, the entire seat assembly can be "hung" or suspended off the upper outer pillow blocks 120, if desired, so that the downward bearing forces of the seat and its occupant are not directed onto the floor of the aircraft. This is a particularly valuable expedient in those types of aircraft which do not have a structural floor strong enough to support such a load.

The construction and correlation of the catapult tubes is such as to prevent any "tip-off" problems from occurring and the catapult gases can be utilized for various sequencing operations. While these gases have been specifically described as being used for initiating the rocket means 130, such gases could also be used for such other functions as automatic lap-belt opening, canopy ejection, and so on. Thereby eliminating the need for a multiplicity of gas-generating devices to do such tasks, as employed in prior art systems. The safety handle 210 provides a unique and simple expedient for rendering the seat completely safe while it is being worked upon, installed, or so on, so that under no circumstances can the torque tube rotate and the sear 58 be extracted from the explosive cartridge 56.

After reading the foregoing detailed description, it will be apparent that the invention set forth herein describes a new, unique and useful system which accomplishes the objects set forth at the outset hereof. However, since the foregoing detailed description was directed only to a preferred embodiment of the invention, various changes and modifications apparent to those skilled in the art can be made without departing from the spirit and scope of the invention.

What is claimed is:

1. In an aircraft ejection seat, the combination comprising:
   a seat structure including a seat back and a seat pan;
   headrest means;
   attaching means mounting said headrest means above said seat back;
   said attaching means including releasable locking means normally maintaining said headrest means rigidly in position to permit the occupant of the seat to rest his head thereagainst;
   said locking means being releasable, during ejection of said seat from said aircraft, to thus permit said headrest means to swing rearwardly so it will not interfere with the separation of the occupant from the seat;
   said attaching means including a pair of oppositely directed laterally extending axially aligned mounting pins which mount said headrest means in its position above said seat back; and
   said locking means including a pair of oppositely directed, laterally extending, axially aligned locking pins movable between a projected position where they prevent said headrest means from pivoting about said mounting pins and a retracted position where they permit said headrest means to pivot rearwardly about said mounting pins.

2. In an aircraft ejection seat, the combination comprising:
   a seat structure including a seat back and a seat pan;
   headrest means;
   attaching means mounting said headrest means above said seat back;
   said attaching means including releasable locking means normally maintaining said headrest means rigidly in a first position to permit the occupant of the seat to rest his head thereagainst;
   said locking means being releasable, during ejection of said seat from said aircraft, to thus permit said headrest means to swing rearwardly to a second position so it will not interfere with the separation of the occupant from the seat; and
   said headrest means having a rear surface which, in said first position, is substantially coextensive with said seat back but which, in said second position, is disposed substantially behind said seat back and at an angle with respect to said seat back.

3. In an aircraft ejection seat having an upstanding seat back, the combination comprising:
   a pair of spaced catapult tubes extending along said seat back and above said seat back;
   headrest means disposed above said seat back and between said spaced capapult tubes;
   pivot means extending between said catapult tubes and said headrest means for mounting said headrest means;
   locking means normally locking said headrest means in a forwardly extending position and preventing said headrest means from pivoting about said pivot pin means;
   said locking means normally projecting between said headrest means and at least one of said catapult tubes; and
   means for releasing said locking means during ejection of said seat from an aircraft to permit said headrest means to pivot about said pivot means and swing rearwardly to avoid interference with separation of the occupant from the seat.

4. In an ejection system for an aircraft including at least one seat which can be selectively ejected from the cockpit of the aircraft, the improvement in releasably positioning said seat in said cockpit, which comprises:
   a pair of upstanding elongated ejection rail means which guide the egress path of said seat from said cockpit during ejection;

each of said ejection rail means including a central portion and oppositely directed flange portions connected to said central portion;

said central portion and said flange portions thus defining on each of said rail means, a pair of opposed channels, said channels extending along said central portion on opposite sides thereof;

said pair of ejection rail means being disposed in generally parallel relationship with one another so that one channel on each of said rail means will confront one channel on the other of said rail means, said confronting channels being disposed in spaced relation but jointly defining inner channels, the other channels of each of said rail means jointly defining outer channels;

said seat having a first set of bearing block means attached thereto and said ejection rail means being coupled with said seat by engagement of said first set of bearing block means within said inner channels;

said cooperative engagement between said first set of bearing block means and said inner channels guiding the egres path of said seat when said seat is ejected from said cockpit;

a second set of bearing block means attached to said aircraft within said cockpit;

said ejection rail means being coupled with said second set of bearing block means by engagement of said second set of bearing block means within said outer channels; and said cooperative engagement between said second set bearing block means and said outer channels enabling the combination of said seat and said ejection rail means to be readily installed in said cockpit as a unit.

5. The improvement defined in claim 4 further including mounting block means attached to each ejection rail means at the upper end of each outer channel, said mounting block means abutting against the uppermost of said second set of bearing block means to thereby support said ejection rail means and the seat attached thereto by suspending the combination thereof from said uppermost of said second set of bearing block means.

6. The improvement defined in claim 4 wherein said central portion of each ejection rail means has an aperture therethrough adjacent the upper end of said ejection rail means, and wherein mounting bolt means extend through said apertures and into said second set of bearing block means to thereby fixedly attach said ejection rail means to said second set of bearing block means.

7. The improvement defined in claim 4 wherein said flange portions include first sections extending generally perpendicular to said central portion along its opposite edges, and second sections extending generally perpendicular to said first sections and hence generally parallel to said central portion, each said channel being formed between said central portion, two first sections and two second sections, with said second sections being spaced apart from each other to define a continuous slot communicating with said channel.

8. In an aircraft ejection system, the improvement in an ejection seat which comprises:

said ejection seat including a seat pan and an upstanding seat back projecting upwardly at the rear portion of said seat pan;

said seat back including a pair of substantially planar back portions disposed angularly to one another and intersecting one another at an apex;

said back portions subtending therebetween a forwardly directed dihedral angle within which a seat occupant's back would normally be disposed when such occupant is seated upon said seat pan;

said apex extending upwardly along the rear surface of said seat back and being disposed transversely medially of said ejection seat.

9. The improvement defined in claim 8 further including a shelf means coupled with and extending forwardly from said back portions adjacent the lower ends thereof, said shelf means being adapted to serve as a support for a parachute assembly positionable within said dihedral angle formed by said back portions.

10. The improvement defined in claim 9 further including selectively operable power means coupled with said set for enabling said seat to be selectively ejected from the aircraft, said power means comprising:

a pair of catapult assemblies being disposed along said seat back on opposite sides of said apex;

a header interconnecting the lower ends of said catapult assemblies; and pressure generating means coupled with said header, said pressure generating means being selectively operable to transmit high pressures through said header to simultaneously operate said catapult assemblies;

said header and said pressure generating means being disposed at least partially beneath said shelf means.

11. The improvement defined in claim 10 further including a pair of thrust generating rocket means, one of said rocket means being connected to each of said seat back portions laterally outward from the catapult assembly disposed therealong, whereby said catapult assembly is interposed between said apex and said rocket means.

12. The improvement defined in claim 11 wherein each rocket means is operatively connected with its adjacent catapult assembly so that said rocket means are energized responsively to operation of said catapult assemblies.

13. In an ejection seat assembly including a separate headrest means mounted above the seat back and an ejection means coupled with said seat to eject the same from a vehicle within which said seat is movably mounted, the combination which comprises:

an elongated torque tube means extending along said seat back;

means rotatably mounting said torque tube means on said seat back;

said headrest means including a pivot mounting means which enables said headrest means to swing rearwardly from a normal forward position, wherein said occupant can rest the back of his head thereagainst, to a rearward position wherein said headrest means is spaced rearwardly away from the back of the occupant's head;

said headrest means further including locking means which maintain said headrest means in said normal position, said locking means being releasable to permit said headrest means to swing to said rearward position;

first connection means coupled between said torque tube means and said ejection means;

second connection means coupled between said torque tube means and said locking means; and operating means connected with said torque tube meas to effect selective rotation thereof;

said operating means being operative to rotate said torque tube means to a first rotational position whereat said first connection means operates said ejection means to initiate ejection of said seat from said vehicle;

said operating means being further operative to rotate said torque tube means to a second rotational position whereat said second connection means releases said locking means to enable said headrest means to swing rearwardly from said normal position to said rearward position to assure that said headrest means will not interfere with separation of the seat occupant from the seat.

14. The combination defined in claim 13 wherein said locking means includes retractable pin means and wherein said second connection means includes linkage means which retract said pin means when said torque tube means reaches said second rotational position.

15. The combination defined in claim 13 wherein said ejection means includes an explosive cartridge, and a sear normally preventing said cartridge from firing, and wherein said first connection means extracts said sear at said first rotational position of said torque tube means to permit said cartridge to fire.

16. The combination defined in claim 15 further including manually operable safety lever means selectively movable from a first position disengaged from said torque tube means to a second position engaged with said torque tube means to prevent said torque tube means from rotating, thus preventing actuation of said ejection means.

References Cited
UNITED STATES PATENTS

| | | | |
|---|---|---|---|
| Re. 25,612 | 7/1964 | Thorp | 244—122 |
| 2,459,843 | 1/1949 | Scholander | 244—122 |
| 2,755,042 | 7/1956 | Paddon | 244—122 |
| 3,270,991 | 9/1966 | Martin | 244—122 |
| 3,424,409 | 1/1969 | Stanley | 244—122 |

MILTON BUCHLER, Primary Examiner

J. L. FORMAN, Assistant Examiner